United States Patent
Morris et al.

(10) Patent No.: US 11,308,919 B2
(45) Date of Patent: Apr. 19, 2022

(54) MULTIPLE DISPLAY SYNCHRONIZATION

(71) Applicant: Microsoft Technology Licensing, LLC, Redmond, WA (US)

(72) Inventors: Matthew Morris, Seattle, WA (US); Ying Zheng, Redmond, WA (US); Rajesh Dighde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/972,397

(22) PCT Filed: May 23, 2019

(86) PCT No.: PCT/US2019/033633
§ 371 (c)(1),
(2) Date: Dec. 4, 2020

(87) PCT Pub. No.: WO2019/236300
PCT Pub. Date: Dec. 12, 2019

(65) Prior Publication Data
US 2021/0233495 A1 Jul. 29, 2021

Related U.S. Application Data

(63) Continuation of application No. 15/997,176, filed on Jun. 4, 2018, now abandoned.

(51) Int. Cl.
*G09G 5/12* (2006.01)
*G06F 3/14* (2006.01)

(52) U.S. Cl.
CPC ............. *G09G 5/12* (2013.01); *G06F 3/1438* (2013.01); *G09G 2310/08* (2013.01); *G09G 2340/0435* (2013.01)

(58) Field of Classification Search
CPC ....................................................... G09G 5/12
See application file for complete search history.

(56) References Cited

U.S. PATENT DOCUMENTS 9,905,199 B2 2/2018 Liu et al.
2002/0118200 A1 8/2002 Mukherjee et al.
(Continued)

OTHER PUBLICATIONS

"Non Final Office Action Issued in U.S. Appl. No. 15/997,176", dated Nov. 5, 2019, 15 Pages.
(Continued)

*Primary Examiner* — Gustavo Polo
(74) *Attorney, Agent, or Firm* — Ray Quinney & Nebeker P.C.; John O. Carpenter

(57) ABSTRACT

A device (100) includes a plurality of display panels (102), a plurality of display controllers (116), each display controller of the plurality of display controllers being configured to control a corresponding display panel of the plurality of display panels, each respective display controller of the plurality of display controllers being configured to generate a timing indication (134), and a processor (136) coupled to the plurality of display controllers to receive the timing indications from the plurality of display controllers. Each timing indication is indicative of the respective display controller residing in a state ready for refresh of the corresponding display panel. The processor is configured to delay a refresh of the plurality of display panels until the timing indication is received from each respective display controller of the plurality of display controllers to synchronize the plurality of display panels.

20 Claims, 3 Drawing Sheets

(56) References Cited

U.S. PATENT DOCUMENTS

| | | |
|---|---|---|
| 2004/0075621 A1 | 4/2004 | Shiuan et al. |
| 2007/0057865 A1 | 3/2007 | Song et al. |
| 2007/0159412 A1 | 7/2007 | Dai et al. |
| 2008/0150920 A1 | 6/2008 | Yen |
| 2010/0156913 A1 | 6/2010 | Ortega et al. |
| 2011/0134142 A1 | 6/2011 | Yamazaki et al. |
| 2012/0146968 A1 | 6/2012 | Glen |
| 2013/0044089 A1 | 2/2013 | Chang-chian et al. |
| 2014/0292617 A1 | 10/2014 | Tejada Lacaci et al. |
| 2015/0339967 A1 | 11/2015 | Shin |
| 2016/0042707 A1 | 2/2016 | Wang et al. |
| 2016/0275908 A1 | 9/2016 | Kim |
| 2016/0357493 A1 | 12/2016 | Zerwas |
| 2018/0096670 A1 | 4/2018 | Iwaki et al. |
| 2019/0045088 A1 | 2/2019 | Ansari et al. |
| 2019/0222855 A1 | 7/2019 | Shekhar et al. |

OTHER PUBLICATIONS

Hussain, et al., "White Paper | Vesa Displayport Adaptive-Sync", In White Paper of VESA, Mar. 2014, 4 Pages.

"International Search Report and Written Opinion Issued in PCT Application No. PCT/US19/033633", dated Sep. 3, 2019, 16 Pages.

ered, and/or another element, such as an external hardware element (e.g., a state machine), to provide host processor time to complete rendering of the content of a frame. In cases in which all of the display controllers implements instructions or otherwise controls the amount of extra blanking, one of the display controllers may be defined as a master or primary display controller. The master or primary display controller may be statically or dynamically configured during the operation of the device.

MULTIPLE DISPLAY SYNCHRONIZATION

CROSS REFERENCE TO RELATED APPLICATIONS

This application is a U.S. Nationalization of PCT Application Number PCT/US2019/033633, filed on May 23, 2019, which claims priority to U.S. patent application Ser. No. 15/97,176, filed on Jun. 4, 2018, the entireties of which are incorporated herein by reference.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
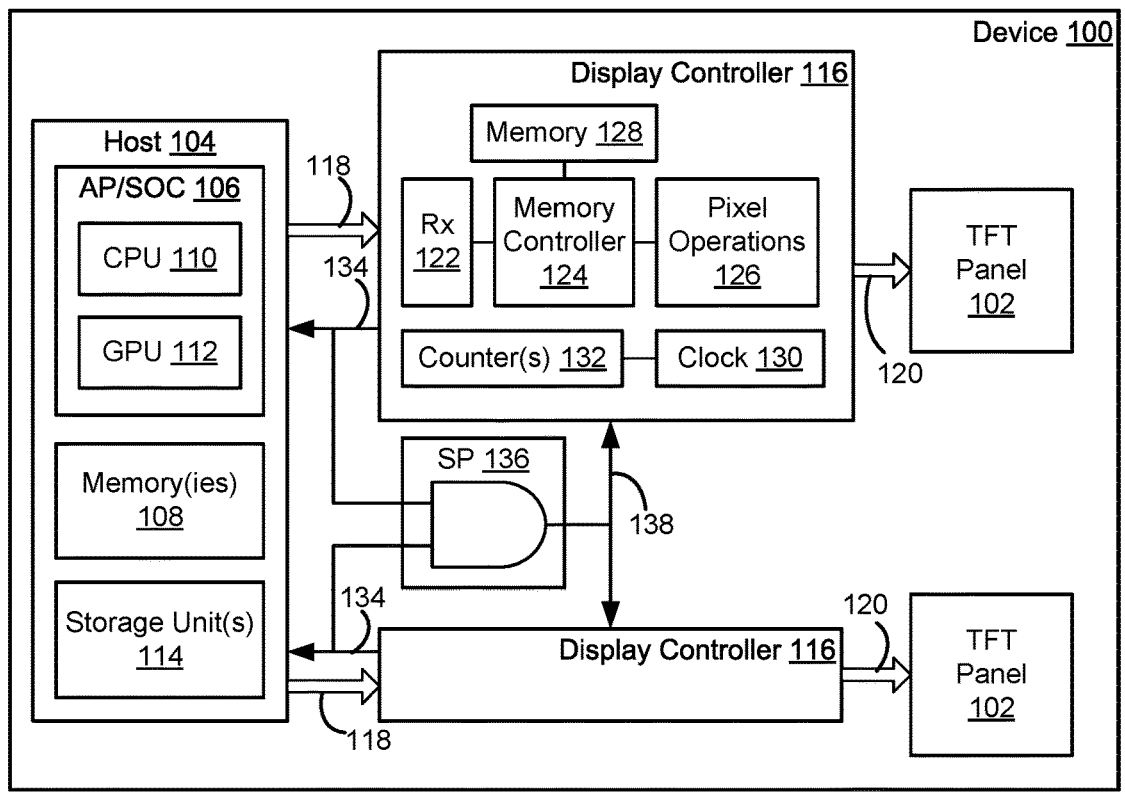
FIG. 1 is a block diagram of a device configured for synchronization of multiple displays in accordance with one example.

The embodiments of the disclosed devices and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION

Described herein are devices and methods that synchronize multiple display panels. The synchronization may be achieved by varying blanking or timing between display frames. Without the synchronization, multiple display panels would operate asynchronously, presenting different timing requirements to a host processor. For instance, each display panel may have an integrated timing controller that would, in a single-display context, force the host processor to adapt a display rendering rate of the host processor to the clock or other timing specified by the timing controller. When two or more displays are connected to the same host, manufacturing variances lead to asynchronous operation of the displays. Left unaddressed, the asynchronous operation results in drift in the relative phase of the displays.

The devices and methods maintain the alignment of frames in a device having two or more asynchronously timed display panels. The synchronization provides for isochronous operation of the multiple display panels. Isochronous operation is achieved despite manufacturing variances or other offsets in clock or other refresh rates of the display controllers. The isochronous operation is also achieved without synchronizing clocks of the multiple timing controllers.

The synchronization uses timing indications provided by display controllers for the multiple display panels. The disclosed devices and methods delay a refresh of the multiple display panels until all of the timing indications are received, e.g., until the timing indication is received from each respective display controller of the device. Each timing indication is indicative of the display controller residing in a state ready for refresh of the corresponding display panel. In some cases, the timing indication is or includes a tearing effect (TE) or other timing signal provided by a display controller to prevent tearing on the corresponding display panel. The timing signal may be considered or configured as an anti-tearing timing signal. The anti-tearing or other timing signal may be used as part of a refresh delay technique, such as Adaptive Sync, directed to addressing the challenge presented by asynchronous host processor image data generation (e.g., rendering) and display refresh. The refresh delay technique allows an application processor to delay the writing of image data until the timing signal indicates that the display controller resides in the state ready for refresh. The refresh delay technique allows the timing controllers to insert extra blanking at the start or end of refresh timing of a display. The amount of extra blanking is controlled by the host processor, one or all of the display controll The disclosed devices and methods may synchronize the multiple display panels by sending a refresh instruction. The instruction may be sent via a bus or other command interface, such as a Mobile Industry Processor Interface (MIPI) command mode serial interface. Alternatively or additionally, the disclosed devices and methods generate a trigger signal (e.g., a dedicated trigger signal) to maintain synchronization. The trigger signal may be useful when instructions or other data (e.g., data packets) are not being provided via the bus or other command interface. The bus or other interface may be disabled to save power. The interface may be disabled in connection with a host processor residing in a sleep or other reduced power state, such as when the host processor is not actively providing image data to the display controllers.

The disclosed devices and methods synchronize the multiple displays without forcing all displays to synchronize to a master clock. Avoiding a master clock declaration is useful. For instance, resorting to declaring that a particular display's clock is the master gives rise to complications when the particular display is not used, malfunctioning, etc. Without resorting to a master clock, any one or more of the displays of the disclosed devices may be enabled and disabled as desired without adversely affecting the synchronization.

The nature of the disclosed devices may vary considerably. For instance, the form factor of the devices may vary from handheld, worn, or other portable devices to desktop, wall-mounted, or other large scale devices. The devices may or may not be computing devices. For instance, the disclosed methods may be useful in connection with television monitors in addition to smartphones and tablets. The synchronization techniques described herein may be used with any dual- or multiple-display device. The disclosed devices may accordingly be considered or configured as systems.

FIG. 1 depicts a device 100 in which display synchronization is implemented in accordance with one example. The device 100 includes multiple displays. In this example, the multiple displays include two display panels 102. Each display panel 102 may be configured as a thin-film transistor (TFT) panel. Each display panel 102 may be configured as, or include, a touchscreen. Each display panel 102 may accordingly include a touch sensor array disposed along a transparent cover or other layer of the display panel 102. The device 100 may be or include any electronic device having the multiple display panels 102 display, including, for instance, a smartphone, tablet, notebook computer, or smart television or other monitor. The arrangement, size, shape, emission type, and other characteristics of the display panels 102 may vary accordingly. For example, the display panels 102 may or may not include a backlight unit. Additional display panels 102 may be included.

The display panels 102 may or may not be identical or similarly configured. In some cases, the display panels 102 are similarly configured but nevertheless exhibit differences arising from, for instance, manufacturing variances. The manufacturing variance may lead to a difference in a clock or refresh rates. For example, the internal clocks of display controllers for the display panels 102 may differ. The display panels 102 may nominally have a refresh rate of, for example, 60 Hz. With the manufacturing variance, one display panel 102 may exhibit a refresh rate of about 59.99 Hz. The other display panel 102 may exhibit a different refresh rate of about 60.01 Hz. Left unaddressed, the difference in refresh rates results in asynchronous display refresh and eventually an offset between the display panels 102.

The nature of, underlying reasons for, and other characteristics of the differences between the display panels 102 may vary. For instance, the difference(s) may arise from additional or alternative aspects of the display panels 102. For example, the display panels 102 may exhibit different refresh rates due to different aging or usage profiles.

The arrangement of the display-related components of the device 100 may vary. For instance, the components of the device 100 for a particular one of the display panels 102 may be arranged in a respective display module. The components associated with one or more display panels 102 may be integrated to any desired extent. For example, a display controller for each panel 102 may be integrated with the display panel 102 in a display module and/or as a display unit.

The device 100 includes a host 104. The host 104 may be a computer, computing unit, electronics unit, or other unit responsible for providing or generating image data for rendering on the display panels 102. The host 104 includes a processor or processing unit 106. The processor 106 is configured to generate the image data for rendering on the display panels 102. In some cases, the processor 106 is configured as or otherwise includes an application processor.

The host 104 includes one or more memories 108. The processor 106 may be configured via instructions and/or data provided via the memory 108. Alternatively or additionally, the processor 106 includes integrated memory on which the instructions and/or other instructions are stored.

The processor 106 may be or include a general purpose, programmable processor. The memory 108 may be directly addressable by the processor 106. Instructions and/or other data stored on the memory 108 may configure to the processor 106 to implement tasks and/or other operations. For instance, the operations may be directed to providing general graphics processing for the device 100. The processor 106 thus generates or provides image data to be rendered on the display panels 102. In some cases, the operations include implementing an operating system, and executing applications running with an environment established by the operating system. Alternative or additional operations may be implemented. For instance, the processor 106 may be configured to implement a number of background services for the device 100, including, for instance, data communication services.

The processor 106 may include any number of processors, processing units, cores, or other elements. In the example of FIG. 1, the processor 106 includes a central processing unit (CPU) 110 and a graphics processing unit (GPU) 112 integrated with one another as a system-on-a-chip (SOC). The extent of the integration may vary. For instance, the CPU 110 and the GPU 112 may be disposed on a separate integrated circuit (IC) chips in other cases. The GPU 112 (and/or other unit of the processor 106) is configured to generate image data to support the general graphics processing for the device 100. The image data may be representative of a variety of different types of images, including, for instance, any type of graphics, such as stylus strokes.

Instructions and/or other data for the processor 106 are stored on one or more storage units 114. The storage unit 114 may be or include a flash storage or other drive or other non-volatile storage unit. Instructions or data are read from the storage device 114 and then written to the memory 108 for use by the processor 108.

The memory 108 may be or include, for example, a random access memory (RAM) unit. Additional or alternative memories may be included. For instance, the device 100 may include one or more read-only memories (ROM) on which firmware and other instructions are stored.

The processor 106, the memory 108, and the storage unit 114 may be considered to be components of a computing system of the device 100. These components may thus be referred to herein as system level components. System level components are involved in general processing, memory, storage, and control of various subsystems, or modules, of the device 100. For instance, the computing system may be considered to include components involved in directing the display panels 102 and other input/output devices, modules, or units of the device 100. In contrast, processing, memory, or other components directed to a specific function, such as display functionality, may be considered to be at a module level, as in components of the display module. The device 100 has a number of additional subsystems or modules (e.g., a respective subsystem for each input/output component, such as a touch subsystem), as opposed to a single system level.

The processor 106 may be configured to operate in one or more low power modes. Graphics functionality of the processor 106 may be suspended while the processor 106 resides in the low power mode. For instance, the processor 106 may discontinue the generation of image data while residing in a low power mode associated with the implementation of a panel self refresh routine. The low power modes may alternatively or additionally include one or more sleep modes in which the graphics functionality of the processor 106 is suspended. The suspension of operations in a sleep mode extends beyond the graphics functionality of the processor 108. For instance, the processor 108 is deactivated to a greater extent in a sleep mode than the deactivation that occurs during, for example, implementation of a panel self refresh routine. Any number of general purpose operations of the processor 108 are also suspended.

The host 104 may include additional, fewer, or alternative components. For example, the host 104 may include a touch controller and/or digitizer to process data generated by a touch sensor array. Any number of processors, memories, and/or storage units may be included. The components of the host 104 may be integrated with one another and/or other elements of the device 100 to any desired extent.

The device 100 includes a display controller 116 for each display panel 102. Each display controller 116 is configured to control a corresponding panel of the display panels 102. The display controller 116 may be or include one or more integrated circuits, such as a display driver integrated circuit (DDIC). Each display controller 116 may be integrated with other components or elements of a display and/or display module that includes the corresponding display panel 102. In the example of FIG. 1, each display controller 116 is or includes a circuit or other unit discrete from the display panel 102. In other cases, one or more aspects of each display controller 116 and the corresponding display panel 102 may integrated to any desired extent. Alternatively or additionally, one or more aspects of each display controller 116 may be integrated with the host 104.

Each display controller 116 receives image data from the processor 106 for the images to be rendered on the corresponding display panel 102. The image data may be provided by the processor 106 on a bus or other interface 118. The interface 118 may accordingly be referred to as an image data interface. In some cases, the interface 118 is configured as a command interface, such as a MIPI command interface, via which instructions may also be provided to the display controller 116. Other types of interfaces, and the corresponding protocols, may be used. For instance, each interface 118 may be configured in accordance with the embedded DisplayPort (eDP) protocol.

Each display controller 116 is configured to generate pixel control signals from the image data for the corresponding display panel 102. The pixel control signals from each display controller 116 may be provided by a respective set of electrical connections 120 that connect the display controller 116 to the display panel 102. The electrical connections 120 may be or include a ribbon cable, other flex cable, or other connector. In some cases, the pixel control signals are configured to direct one or more source (or data) drivers and one or more gate drivers of the display panel 102. Together, the source and gate drivers send control signals to individually control the thin-film transistors of each pixel (or sub-pixel) of the display panel 102. Alternatively or additionally, the display controller 116 may or may not include the source, gate, and/or other drivers.

Each display controller 116 may be configured to process the image data from the processor via a processing pipeline. The display controller 116 includes a number of components or elements disposed along the pipeline. In the example of FIG. 1, the display controller 116 includes a receiver 122, a memory controller 124, and one or more pixel operations units 126. The order of the elements along the pipeline may vary from the example shown. For instance, one or more of the pixel operations units 126 may be disposed before one of the other depicted elements. Additional, fewer or alternative elements may be included. For instance, the pipeline may include an ink rendering engine for incorporating image data associated with stylus and other touch events.

The receiver 122 may be configured to process the image data provided by the processor 106 via the interface 118. In some cases, the image data is provided in packet form, e.g., via packetized data transmissions. For example, the image data may be provided in packets formatted and otherwise formed in accordance with the MIPI, eDP or other protocols. Other video interface standards or protocols may be used, such as the DisplayPort interface protocol.

The receiver 122 may be configured to generate pixel data from the image data provided by the processor 106. For instance, the receiver 122 may convert the packets of the image data into respective data for each pixel of the display panel 102. The pixel data may be assembled or arranged by the receiver 122 into respective frames (frame data) to be rendered concurrently (or effectively concurrently) on the display panel 102. Alternatively, the frame data is assembled or otherwise derived from the image data by another component along the pipeline. For example, in some cases, the frame data is derived from the pixel data by the memory controller 124.

The pixel data or the frame data is provided to the memory controller 124. The memory controller 124 is configured to store the frame data derived from the image data in a memory 128. For example, the frame data for each frame may be stored in the memory 128 as a respective dataset. The memory 128 may thus be configured as or otherwise considered a frame buffer. The memory 128 may include one or more random access memory (RAM) or other units. In some cases, the memory controller 124 and the memory 1248 are configured to support and/or otherwise implement a panel self refresh routine via storage of the frame data in the memory 128. Alternatively or additionally, the memory 128 is used to support other routines or procedures, such as frame rate control and overdrive procedures.

The pixel operation unit(s) 126 are configured to use the frame data to generate pixel control signals for the display panel 102. The pixel control signals are configured for use by the source and gate drivers. The pixel control signals are representative of the timing involved in updating or otherwise refreshing the images rendered via the display panel 102. The display controller 122 may determine or otherwise control the timing of the pixel control signals. The timing is determined to appropriately render the images representative of the image data received from the processor 108 given the refresh rate and other characteristics of the display 102. For example, the timing established by the pixel operations unit(s) 126 may involve establishing the timing of raster refresh operations and vertical refresh operations for the display panel 102. For these and other reasons, each display controller 116 may be considered to be, or include, or be referred to as, a timing controller (e.g., TCON) for the corresponding display panel 102.

Alternative or additional pixel operations may be implemented by the pixel operation unit(s) 126. For example, the pixel operations may include, without limitation, gamma correction, ambient color correction, color gamut mapping (e.g., through a three-dimensional lookup table), dithering, dynamic backlight control, and sub-pixel optimization (e.g. for Pentile displays).

Each display controller 116 may include fewer, additional, or alternative components. For instance, the display controller 116 may not include one or more of the pixel operation elements. In some cases, an ink rendering engine may be included for incorporating data representative of stylus strokes into the image data to be rendered. The additional elements may or may not be disposed along the pipeline.

Each display controller 116 may be realized on one or more IC chips. The functionality of the display controller 116 may be integrated to any desired extent. In some cases, the display controller 116 is implemented in a multi-component package. In still other cases, one or more aspects of the display controller 116 may be implemented on a printed circuit board or other circuit arrangement.

Each display controller 116 is configured to generate a timing indication to prevent tearing or other adverse effects of asynchronous operation of the display controller 116 and the processor 106. The timing indication may be a signal or other indication that the respective display controller 116 resides in a state ready for refresh of the corresponding display panel 102. In some cases, the timing indication is or includes a tearing effect (TE) signal, such as the TearEffect (TE) signal from a MIPI DDIC controller. The TE signal may be a dedicated voltage signal that toggles between two states, e.g., a zero state indicative of non-readiness and a non-zero state indicative of readiness. However, the timing indication may or may not be configured as a pulse. The timing indication may be any signal or other indication generated or provided once per frame when the display controller 116 is ready to receive new image data.

The TE signal or other timing indication may be generated and/or configured in accordance with techniques directed to preventing tearing. Further information regarding how the TE signal or other timing indication is used to prevent tearing is provided in connection with FIG. 2.

The TE signal or other timing indication may be generated by one or more elements of the display controller 116. In the example of FIG. 1, the display controller 116 includes a clock 130 that increments one or more counters 132. For instance, one counter 132 may control the duration of horizontal blanking and pixel charge time. This duration is associated with the rendering of each horizontal line. Another counter 132 counts the number of horizontal lines in a frame and any vertical blanking lines, which together constitute the duration of a display frame. The timing indication may be generated by or via either one or both of the counters 132. For example, the timing indication may be a pulse or other indication generated by the counter(s) 132 once the counter(s) 132 reach a predetermined value indicative of the end of the frame. Alternatively or additionally, the timing indication may be generated by another element or component of the display controller 116. For instance, the timing indication is or includes a signal generated by the memory controller 124. For example, the memory controller 124 may generate a pulse or other signal in response to the counter(s) 132 and/or upon reaching the beginning, end, or other predetermined portion of a frame. Alternatively or additionally, the pixel operation unit(s) 126 is/are involved in generating the timing indication in response to the counter(s) 132.

The processor 106 is coupled to the plurality of display controllers 116 to receive the TE signals or other timing indications. The manner in which the TE signal or other timing indication is provided to the processor 106 of the host 104 may vary. For instance, the timing indication may be provided on a dedicated signal line 134 between the display controller 116 and the host 104, as shown in FIG. 1. The signal line 134 may thus be separate from the interface 118. Alternatively or additionally, the timing indication may be provided via the interface 118 or a different interface, bus, or other communication channel or connection. For example, the timing indication may be provided in or as a message (e.g., an in-band message) over a common bus (e.g., a bus coupling the host 104 and the display controller 116), such as MIPI, HDMI, eDP or other bus. In such cases, the timing indication may be configured as a command or other instruction. The nature and other characteristics of the timing indication may vary accordingly. For instance, the timing indication may be provided in a data packet or other data package. In some cases, the device 100 may be configured to support multiple types of timing indications (e.g., both a message and a dedicated signal), and select one type for use based on current operating conditions or other factors.

The device 100 uses the TE signal or other timing indications from all of the display controllers 116 collectively. As a dedicated signal per display panel 102, each TE signal is conventionally used to prevent tearing on a single display. Rather than use the timing indication solely for anti-tearing efforts in connection with a single display, the timing indications from all of the display controllers 116 are gathered by the device 100 for use collectively to synchronize the multiple display panels 102. In the example of FIG. 1, the host 104 (e.g., the processor 106) receives the timing indication from each display controller 116.

The processor 106 is configured to delay a refresh of the display panels 102 until the timing indication is received from each respective display controller 116 to synchronize the display panels 102. The delay may be implemented via an Adaptive Sync or other technique responsive to the timing indication. Adaptive Sync is a Video Electronics Standards Association (VESA) standard that establishes a protocol or other procedure for delaying the refresh of a display panel asynchronously timed relative to the host. As described further in connection with the example of FIG. 2, the host 104 may use the Adaptive Sync delay to delay the refresh of all of the display panels 102 until all of the display panels 102 are ready for refresh.

In the example of FIG. 1, the processor 106 of the host 104 is configured to determine whether all of the display controllers are ready for refresh, as evidenced by receipt of the timing indications. Upon receipt of the timing indication from each display controller 116 (and thus all display panels 102), the processor 106 directs all of the display controllers 116 to refresh their corresponding display panels 102 effectively concurrently. For example, the processor 106 may send a StartRefresh or other refresh instruction to all of the display controllers 116 effectively concurrently. The instructions may be sent via the command interfaces 118 between the display controllers 116 and the processor 106.

The manner in which the refresh is delayed may vary. Other protocols or techniques may be used, including techniques established In connection with other proprietary standards, such as Nvidia G-Sync, AMD FreeSync, AMD FreeSync 2, and Nvidia's Adaptive Vsync. Any technique that allows the processor 106 of the host 104 to control the delay of refresh of an asynchronous display/panel may be used.

The type, delivery mechanism, protocol, and other characteristics of the refresh instruction from the processor 106 may vary. For instance, the refresh instruction may be or include any type of message (e.g., an in-band message) over a common bus or other interface, such as a MIPI, HDMI, or eDP interface. The message may be configured in accordance with any protocol, including existing protocols, such as the StartMemoryWrite command of the MIPI protocol, or future protocols.

The refresh may be delayed and then collectively started without relying on the processor 106 of the host 104. The timing indication may be provided to another processor of the device 100 to that end. In the example of FIG. 1, the timing indications are provided to a signal processor 136. The signal lines 134 may be tapped or otherwise accessed or otherwise provided to the signal processor 136. The signal processor 136 is configured to determine whether all of the timing indications have been received. The signal processor 136 is thus also configured to determine whether all of the respective display controllers 116 reside in a ready-for-refresh state.

The signal processor 136 is configured to send a refresh trigger signal to each display controller 116 once the timing indication is received from each display controller 116. In the example of FIG. 1, the signal processor 136 is, includes, or is configured to implement, an AND operation on the TE signals (or other timing indications) generated by the display controllers 116. In the example of FIG. 1, the refresh trigger signal corresponds with the output of the AND operation. The signal processor 136 may include additional or alternative elements. For instance, the signal processor 136 may include a counter or timer to track the time elapsed since the last refresh. Further processing (e.g., processing of the output of the AND operation) may be implemented to generate the refresh trigger signal.

The refresh trigger signal is used by the display controllers 116 to synchronize a refresh of the display panels 102. Each display controller 116 may respond to the refresh trigger signal from the signal processor 136 in a manner similar to the response to a refresh instruction via the command interface 118. In contrast, the refresh trigger signal may be provided to each display controller 116 on a respective signal line 138 between the signal processor 136 and each display controller 116. The signal lines 138 may be dedicated signal lines, as shown in FIG. 1. Alternatively, the signal lines 138 may be integrated with other signal lines, interfaces, channels, or other connections to any desired extent.

Each display controller 116 may be enabled to be responsive to the refresh trigger signal. For instance, the processor 106 may provide an enable instruction or other signal (e.g., EXT_TRIG_EN) to the display controllers 116 to control whether the display controllers 116 are responsive to the output from the signal processor 136 (e.g., the trigger signal indicative of the AND operation. In some cases, the enable signal is provided via the command interface 118. Alternatively, the enable signal is provided via a dedicated signal line.

The enable signal may allow the device 100 to transition between an instruction mode and a signal mode. For example, the device 100 operates in the instruction mode when the display controllers 116 await a refresh instruction via the command interface 118. The device 100 operates in a signal mode when the display controllers 116 await the refresh trigger signal.

The signal mode may be useful in circumstances in which deactivating the processor 106 and/or the interface 118 is warranted. For example, the processor 106 may be deactivated or inactive in the sense that image data is not being generated. Deactivating the processor 106 and/or the command interface 118 allows power to be saved. One example of a deactivation of the processor 106 involves a panel self refresh operation. The signal processor 136 is enabled to control the display controllers 116 when the display controllers 116 are operating in a panel self-refresh mode of operation. Non-graphics functionality of the processor 106 may remain operational during a panel self refresh operation or other deactivation of the processor 106.

In some cases, the processor 106 is configured to determine whether to operate in the instruction mode or the signal mode. For instance, the processor 106 may select one of the modes based on a current operational condition. Additional or alternative circumstances may be taken into account. For instance, the processor 106 may select based upon the receipt of another command or instruction.

The signal processor 136 may be provided on a separate integrated circuit (IC) chip or other discrete component. In the example of FIG. 1, the signal processor 136 is separate from the display controllers 116 and the host 104. In other cases, the signal processor 136 may be integrated with one of the other components of the device 100 to any desired extent. For example, the signal processor 136 may be integrated with one or more of the display controllers 116, as described below in connection with the example of FIG. 4. The signal processor 136 is alternatively integrated with the processor 106 or a unit thereof.

Figure 2:
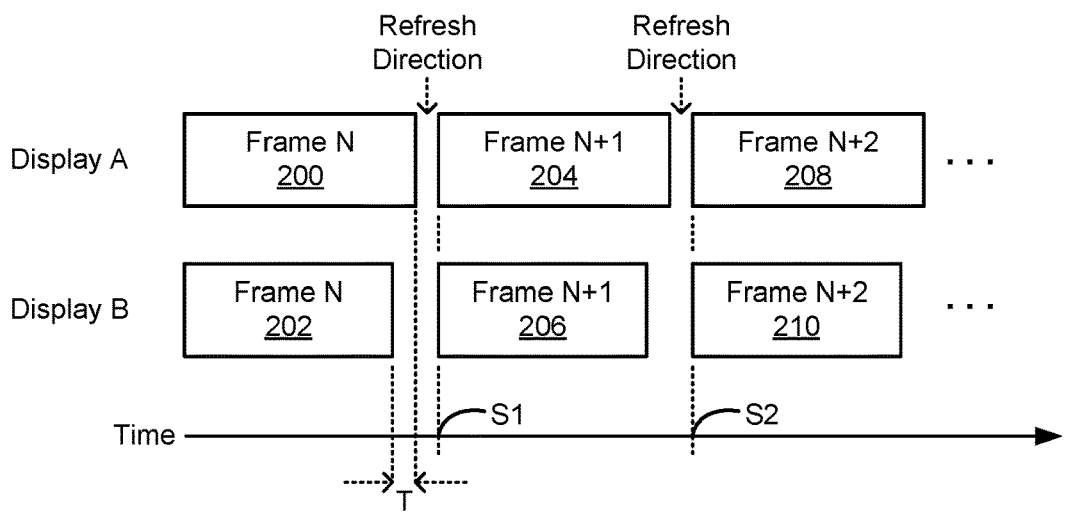
FIG. 2 is a timing diagram of frame refresh sequences in a device having multiple displays synchronized in accordance with one example

FIG. 2 depicts an example of the synchronization of two display panels using the above-described technique. A first display panel, Display A, has a slow or slower refresh rate. A second display panel, Display B, has a fast or faster refresh rate. The difference in refresh rates may arise from a difference in the internal clocks of the display controllers (e.g., DDICs) and/or any other difference. In any case, the displays are asynchronously timed. So the displays finish processing frames at different times. In the example of FIG. 2, a first frame N is processed in time periods 200, 202 by the Displays A, B, respectively. The time period 200 is longer than the time period 202 by a time lag T. The Displays A, B provide timing indications (e.g., a TE or other timing signal) upon the conclusion of the time periods 200, 202.

The Displays A, B are not directed to begin a refresh until the conclusion of both of the time periods 200, 202, i.e., until the receipt of both of the timing indications. The refresh of the faster display panel, Display B, does not occur as quickly or early as the refresh otherwise would. Instead, the refresh of Display B waits until the conclusion of the time period 200, as shown, after which a refresh direction is provided to the Displays A, B. The refresh direction may be or include one of the refresh instructions or refresh trigger signals described above. In either case, the display controllers of the Displays A, B may use Adaptive Sync (or another delay technique) to wait until receipt of the refresh direction to start the process again with another Frame N+1.

The refresh direction may be provided to the Displays A, B simultaneously or effectively simultaneously. As a result, the Displays A, B begin processing the Frame N+1 at a common time S1. The simultaneous send of the instruction or signal results in the simultaneous start of the processing of the next frame. The simultaneous start allows the Displays A, B to remain synchronized. The Displays A, B may again finish processing the Frame N+1 at different times, as shown by time periods 204, 206. The time periods 204, 206 may or may not correspond with (or equal) the previous time periods 200, 202. Either way, the refresh direction is not provided until the conclusion of both of the time periods 204, 206.

Another refresh direction is provided upon the conclusion of both of the time periods 204, 206. Receipt of the refresh direction directs the Displays A, B to begin to process a Frame N+2 at a common time S2. In this way, display frame synchronization is maintained between the two Displays A, B. The difference between the times S1 and S2 shows how the slower or slowest display effectively establishes the timing for the device.

The synchronization of the Displays A, B does not adversely affect or interfere with anti-tearing effect techniques, such as Adaptive Sync. A delay (e.g., extra blanking) to accommodate a slow processor may still occur. For instance, if the GPU or other processor of the host takes longer than one of the time periods 200, 202 to prepare the image data for the subsequent frame (e.g., the Frame N+1), then the anti-tearing effect processing will give the processor additional time to generate the image data.

However, if a predetermined amount of time lapses, a pulse (or other aspect) of one or more of the TE or other timing indications from the Displays A, B may have ended. As a result, the Displays A, B may then self-refresh with the current frame (e.g., the previously stored Frame N). The TE signal or other timing indication continues to indicate that the displays are not ready to accept the image data for the next frame (e.g., the Frame N+1) until the self refresh processing is complete. Once the processing is complete, another pulse of both of the timing indications is provided, and the image data for the Frame N+1 is then written to the display controllers of the Displays A, B for processing in time blocks 208, 210.

Figure 3:
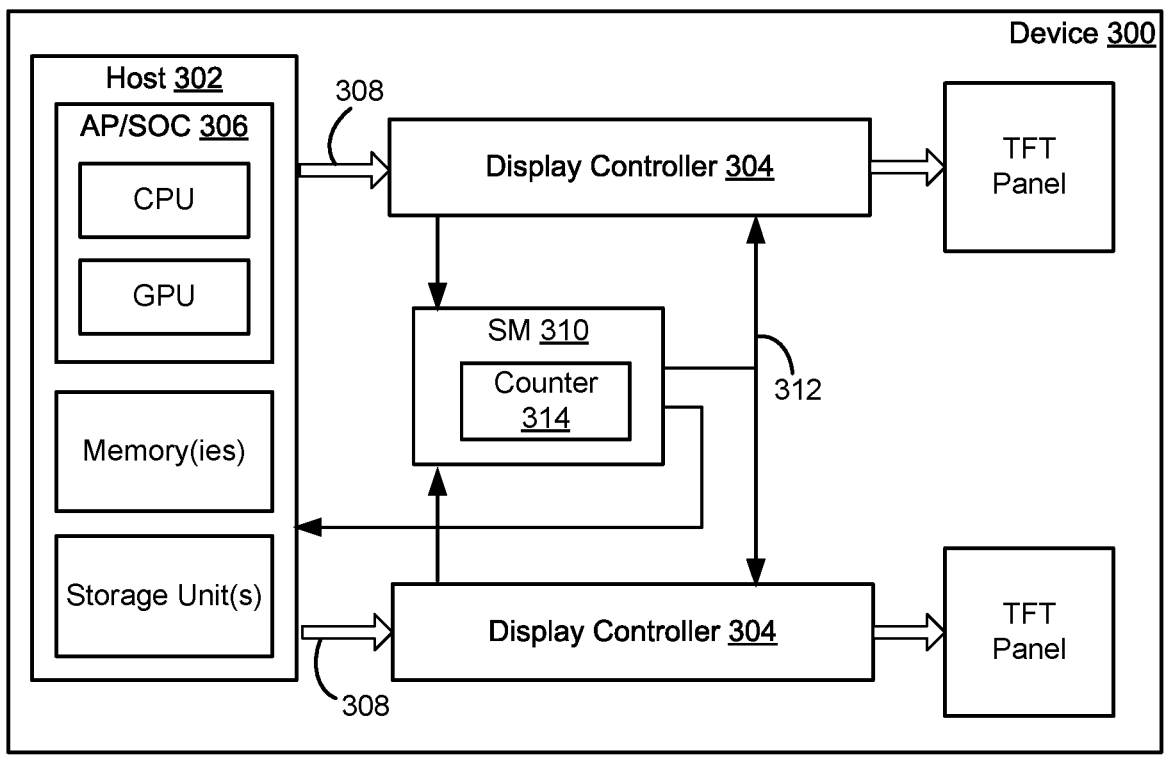
FIG. 3 is a block diagram of a device configured for synchronization of multiple displays in accordance with another example.

FIG. 3 depicts a device 300 configured to support multiple display synchronization in accordance with one example in which an external trigger signal is always used to start the processing of the next frame of image data. Like the examples described above, the trigger signal is external in the sense that the trigger signal is provided separately from a primary communication path between a host 302 and display controllers 304. In this case, however, an instruction to start writing or processing is not provided by a processor 306 of the host 302 via a command or other interface 308 via which image data and other instructions are provided.

The device 300 may have a number of components, aspects, or other characteristics in common with the above-described examples. For instance, the display controllers 304 may have similar components. Other components or aspects may also be in common. For instance, the host 302 may have similar components. Other components, aspects, or elements of the device 300 are also similarly configured unless otherwise described below.

The device 300 differs from the above-described examples in connection with the manner in which timing indications from the display controllers 304 are provided and processed. In this example, a TE signal or other timing indication is provided by each timing controller 304 only to a signal processor 310, rather than to both a signal processor and a host processor as in the example of FIG. 1. The nature of the timing indication may vary as described herein. Once the timing indication is received from each display controller 304, the signal processor 310 may provide a refresh trigger signal to each display controller 304 in a manner similar to the examples described above. For instance, the refresh trigger signal may be provided on a dedicated signal line 312 separate from the command interfaces 308.

The signal processor 310 may differ from the above-described signal processor examples in one or more ways. In some cases, the signal processor 310 is or includes a state machine. The state machine may incorporate or include the AND operation functionality (e.g., solely an AND operation) to determine whether all of the timing indications have been provided. The state machine may include further functionality to address other circumstances presented during operation, such as startup. The state machine may be configured to determine how to initially align and direct the display controllers 304. The state machine may also be configured to implement one or more recovery routines to address failure modes presented by the host processor 306 or other element of the device 300. The state machine of the signal processor 310 may be configured to provide alternative or additional functionality, including, for instance, guaranteeing a minimum length of the refresh trigger signal, knowledge of which direction to change timing in circumstances in which the displays are not synchronized, and measuring the extent to which the displays are synchronized.

The reliance upon on the state machine of the signal processor 310 is useful because the state machine avoids the real-time demands on the instruction-based operations of the host processor 306. The complexity of such instruction-based operations may lead to delays that adversely affect image data and other processing. The signal processor 310 trades off the flexibility of the instruction-based operations for the reliability of the hardware-based configuration of the state machine.

In the example of FIG. 3, the signal processor 310 includes a counter 314 to address one or more conditions or circumstances presented during operation. The state machine may be configured to be responsive to the output of the counter 314 to determine whether to direct the display controllers 304 to implement a refresh. For instance, counter 314 may track the time elapsed since a last refresh. The state machine may be configured to determine if the elapsed time (e.g., the output of the counter 314) crosses a timeout threshold. If yes, the signal processor 310 directs the display controllers 304 to implement a panel self refresh. The timeout threshold may be exceeded in circumstances in which the host processor 306 fails to generate the image data for the next frame sufficiently quickly. In this manner, the next frame of image data is allowed to be written to the display controllers 304 and otherwise processed as long as the image data is available before the timeout condition is reached.

The device 300 also differs from the above-described examples in connection with the manner in which the host processor 306 avoids tearing effects. In this case, the individual TE or other timing indications are not provided to the processor 306. Instead, the signal processor 310 provides a collective TE or timing signal on a signal line 316. The collective TE signal 316 may then be used by the processor 306 to avoid tearing effects as if the device 300 has only a single display controller. In the above-described examples, the host processor 106 of FIG. 1 (e.g., firmware thereof) controls the rate of panel refresh by delaying until all panels were ready. In this example, i.e., the device 300, the signal processor 310, which may be a hardware device or a separate dedicated or shared processing element, offloads the control of the rate of panel refresh from the host processor 306. The signal processor 310 also controls the rate panel refresh by delaying until all panels are ready.

The timing signal on the signal line 316 is generated and provided separately from the trigger signal on the signal line 312 to provide flexibility in the anti-tearing effort. Having two different output signals allows the timing of the refresh within each refresh cycle to be customized or otherwise determined. For instance, the timing signal on the signal line 316 may be offset from the trigger signal to adjust when the image data will be written to the memory within each display controller 304 (e.g., the write pointer) relative to when the image data will be read from the memory (e.g., the read pointer). The alignment of the TE or other timing signal provided to the host processor 306 may thus be adjusted (e.g., from a first line of the frame to a line in the middle of the frame) to improve performance. This adjustment may allow the host processor 306 to offset writing of the frame buffer, thereby providing timing margin to prevent tearing.

Figure 4:
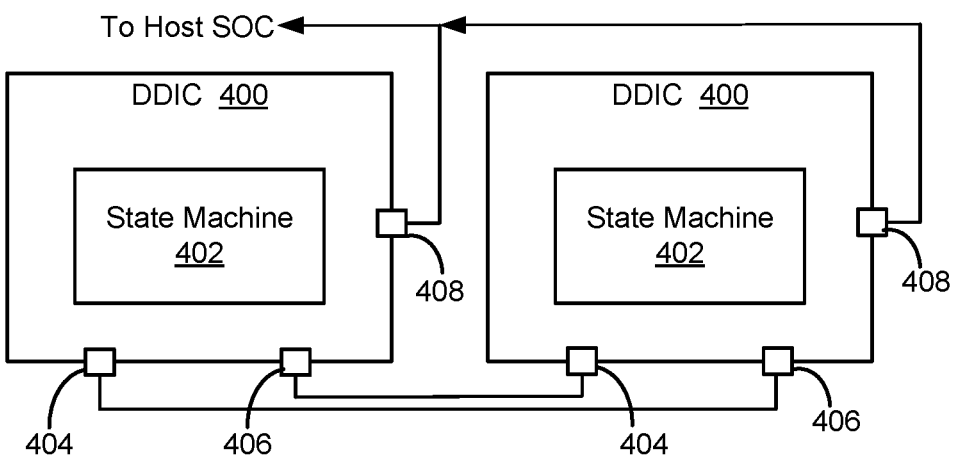
FIG. 4 is a block diagram of a set of multiple display controllers configured for synchronization of multiple displays in accordance with one example.

FIG. 4 depicts an example in which two display controllers 400 include the above-described signal processing functionality. As described above, each display controller 400 may be realized as a discrete integrated circuit, such as a DDIC. In this case, the signal processing is integrated with other display controller processing. Incorporated into each display controller 400 is a signal processor 402 configured as a state machine.

The state machine 402 is configured to generate a trigger signal once the timing signal is received from each respective display controller 400. To that end, the display controllers 400 may be cross-wired with one another. In this example, each display controller 400 includes an input port 404 at which the timing indication is received. Each display controller 400 includes an output port 406 at which the trigger signal is provided. The cross-wiring connects the input port 404 of one display controller 400 with the output port 406 of the other display controller 400.

In the example of FIG. 4, one of the display controllers 400 may be designated or configured as a primary display controller. The other display controller(s) 400 is then designated or configured as a secondary display controller. The designation may toggle or change during operation to address various circumstances or conditions.

The output of each secondary display controller may be indicative of its own state of readiness, i.e., an individual timing indication of whether that respective display controller is ready for refresh. That output is the provided to the input port 404 of the primary display controller. The primary display controller may then use its own timing indication in combination with the timing indication received at the input port 404 to implement the AND operation, i.e., determine whether each display controller is ready for refresh Each display controller 400 may include another output port 408 to provide a collective timing indication to the host processor. The host processor may then operate, at least for tearing effect purposes, as if the device includes only a single display. Upon receipt of the collective timing indication, the host processor provides the image data for the next frame to each display controller 400 simultaneously. The simultaneous start maintains the synchronization of all of the displays, as described herein.

Only the output port 408 of the primary display controller is active. The output ports 408 of all of the display controllers may thus be tied to one another as shown.

Each port 404, 406 may be or include a pin, pad, or other input/output node of the display controller 400. Additional input ports 404 may be provided.

Other aspects of the integration or configuration of the above-described display controllers may vary. Each display controller may be integrated with the other display components to any desired extent. For instance, each display may or may not include the display controller. In some cases, each display includes an integrated timing controller or other display controller configured to provide the timing indication used for synchronization.

Figure 5:
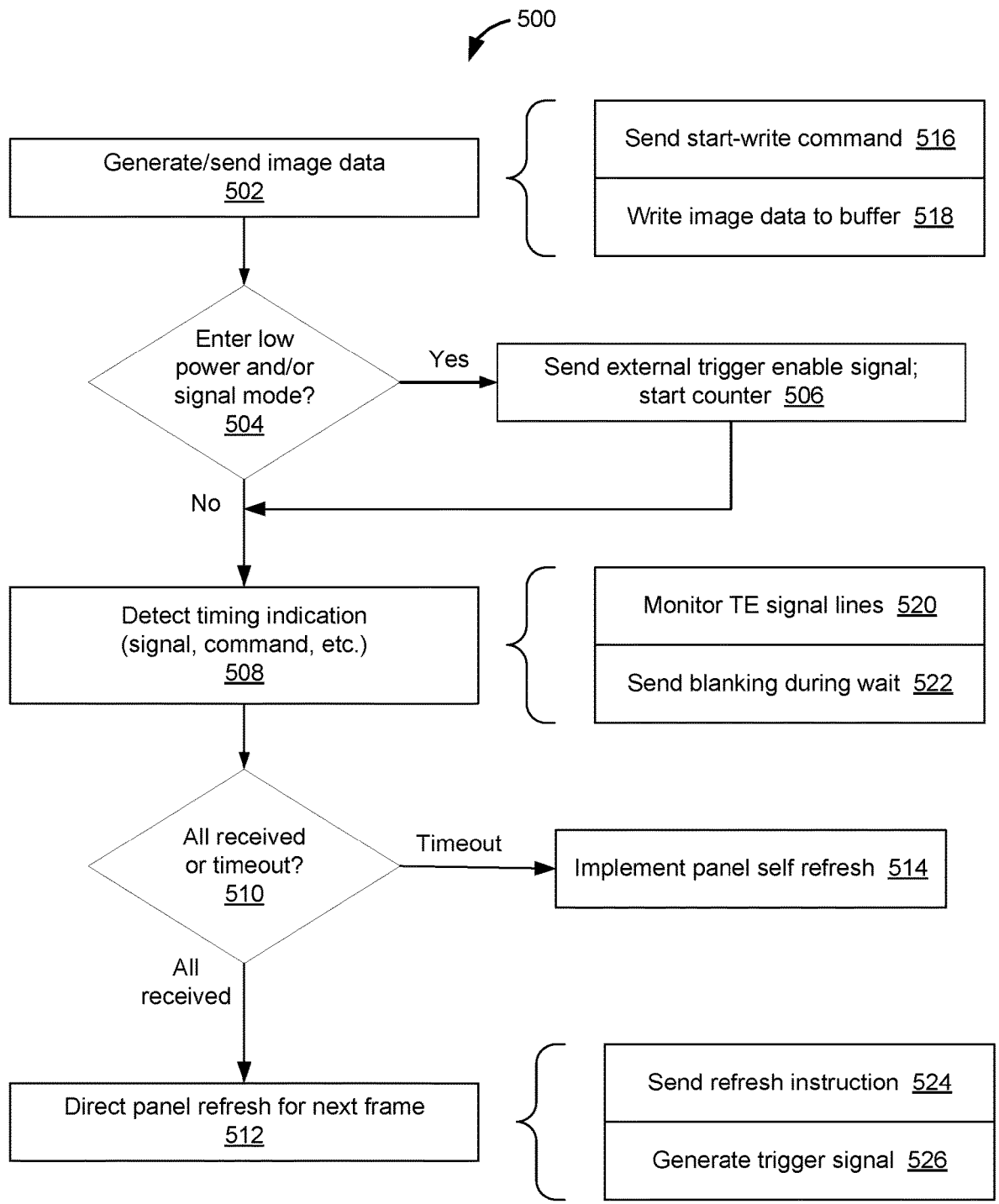
FIG. 5 is a flow diagram of a method of synchronizing multiple displays in accordance with one example.

FIG. 5 depicts a method 500 of synchronizing a plurality of display panels of a device. The method 500 may be implemented by one of the above-described devices or another device. Alternatively or additionally, the method 500 may be implemented in whole or in part via the execution of instructions by one of the above-described processors, such as the processor 106 (FIG. 1), the processor 306 (FIG. 3), and/or another processor. The instructions may be stored on a memory of a host, a display controller, and/or another memory. One or more of the acts of the method 500 may be performed by a signal processor, such as the signal processor 136 (FIG. 1), the signal processor 310 (FIG. 3), the signal processor 402, or another signal processor.

The order of the acts of the method 500 may vary from the example shown. For instance, some of the acts may be concurrently implemented. For example, detection of timing indications in act 508 may be concurrently implemented with the decision to whether enter a low power or other mode in block 504. The acts may also be implemented in a different order. For instance, the block 504 may be implemented at times other than that shown in FIG. 5.

The method 500 may begin with one or more acts directed to startup. For instance, the host may direct the display controllers to keep the display panels black until one or more startup conditions are met.

The method 500 is a recurring procedure with each refresh cycle. For ease in description, the method 500 is presented and described as if the image data for at least one frame is provided. For instance, the method 500 may include an act 502 in which the image data is generated and sent by the host processor for a previous frame. Such previous image data may be sent in accordance with the synchronization techniques described herein.

In the example of FIG. 5, the method 500 then proceeds to a decision block 504 in which the host processor determines whether to enter a low power mode and/or signal mode. A low power mode may be one in which image data is not generated by the host processor. For example, the low power mode may result in the displays implementing a panel self refresh routine. The low power mode may additionally or alternatively involve entering a signal mode in which the display controllers are directed to respond to a refresh trigger signal rather than a refresh instruction. The low power mode and/or signal mode may accordingly involve deactivating a bus or other command interface between the host processor and the display controllers.

If the low power or signal mode is entered, control may proceed to an act 506 in which an enable signal is sent or otherwise made available to enable external triggering of the display controllers. The enable signal may be or include any indication that the display controllers should be responsive to the external refresh trigger signal. The enable signal may be provided to the display controllers and/or the signal processor that generates the trigger signal. In other cases, the display controllers are enabled by implication. For instance, the deactivation of the command interface may be detected by the display controllers as an effective or implicit enable signal.

The method 500 includes an act 508 in which timing indications from each display controller are detected. The detection may be performed by either the host processor or a signal processor. As described above, each timing indication is generated by a respective display controller to indicate whether the respective display controller resides in a state ready for refresh of the corresponding display panel. Each timing indication may be a signal (e.g., a TE signal), a message (e.g., a command bus message), or other indication.

In a decision block 510, the processor determines whether all of the timing indications have been received. The block 510 may be implemented via an AND operation in some cases. In the example of FIG. 5, the block 510 also determines whether a timeout condition has occurred. For these and other reasons, the block 510 may be configured to implement a counter and/or other operations in addition to the AND operation.

Once all of the timing indications have been received, control passes to an act 512 in which the processor directs the display controllers to refresh their corresponding display panels. The refresh direction is provided simultaneously so that the display panels remain synchronized with one another. The method 500 may then return to the act 502 in which the image data is written or otherwise sent to the display controllers.

If the timeout condition occurs, then control passes to an act 514 in which a panel self refresh routine is implemented.

The direction to implemented the panel self refresh routine may also be provided simultaneously to maintain synchronization.

The writing of image data by the host processor, such as in the act 502, may be preceded by the sending of a start-write command or other refresh instruction in an act 516. For example, a WriteMemoryStart command may be provided. The refresh instruction may prepare the display controllers for the receipt of the image data for the next frame. The image data may then be written to a frame buffer or other memory of the display controller in an act 518.

Detection of the timing indications in the act 508 may include monitoring multiple TE or other signal lines in an act 520. Each signal line may be a dedicated line separate from an image data interface via which the display controllers receive the image data. The monitoring may be performed by either the host processor or the above-described signal processors. In other cases, the timing indications are provided in the form of a message or other data packet.

The act 508 may include an act 522 in which the processor sends blanking while waiting for all of the timing indications to be received. The blanking may be sent to display controllers that have already indicated their readiness for refresh, i.e., already provided a timing indication.

Directing the display controllers to refresh their corresponding display panels in the act 512 may include sending a refresh instruction in an act 524. The refresh instruction may be sent from the processor via a command interface between the processor and the respective display controller. Alternatively or additionally, a refresh trigger signal is generated in an act 526 via, for instance, an AND operation of the signal processor.

The disclosed devices and methods achieve multiple-display synchronization via one or both of an in-band or other command or message (e.g., a StartRefresh command) and a dedicated trigger signal. The host processor may configure the display controller or panel to use the in-band or other message or command when the display is being actively updated. The host processor configures the display controller or the panel to use the dedicated trigger signal when the display controller is self refreshing the panel out of internal memory (e.g., a frame buffer). The availability of multiple refresh directions allows the host to power down the high speed interface (e.g., the command interface) to achieve system power savings.

In one aspect, a device includes a plurality of display panels, a plurality of display controllers, each display controller of the plurality of display controllers being configured to control a corresponding display panel of the plurality of display panels, each respective display controller of the plurality of display controllers being configured to generate a timing indication, and a processor coupled to the plurality of display controllers to receive the timing indications from the plurality of display controllers. Each timing indication is indicative of the respective display controller residing in a state ready for refresh of the corresponding display panel. The processor is configured to delay a refresh of the plurality of display panels until the timing indication is received from each respective display controller of the plurality of display controllers to synchronize the plurality of display panels.

In another aspect, a device includes a plurality of display panels, a processor configured to generate image data for rendering on a plurality of display panels of the device, a plurality of display controllers coupled to the processor to receive the image data, each display controller of the plurality of display controllers being configured to control a corresponding display panel of the plurality of display panels of the device, each respective display controller of the plurality of display controllers being configured to generate a timing signal, and a signal processor configured to receive the timing signals from the plurality of display controllers. Each timing signal is indicative of the respective display controller residing in a state ready for refresh of the corresponding display panel. The signal processor is configured to generate a trigger signal once the timing signal is received from each respective display controller of the plurality of display controllers. The trigger signal is used by the plurality of display controllers to synchronize a refresh of the plurality of display panels.

In yet another aspect, a method of synchronizing a plurality of display panels of a device includes detecting, with a processor, a plurality of timing indications, each timing indication of the plurality of timing indications being generated by a respective display controller of a plurality of display controllers, each display controller of the plurality of display controllers being configured to control a corresponding display panel of the plurality of display panels, wherein each timing indication is indicative of the respective display controller residing in a state ready for refresh of the corresponding display panel, and directing, with the processor, the plurality of display controllers to refresh the plurality of display panels once the timing indication from each respective display controller of the plurality of display controllers is detected to synchronize the plurality of display panels.

In connection with any one of the aforementioned aspects, the systems, devices, and/or methods described herein may alternatively or additionally include any combination of one or more of the following aspects or features. The processor is configured to send a refresh instruction to each display controller of the plurality of display controllers upon receipt of the timing indication from each respective display controller of the plurality of display controllers. The processor is configured to generate image data to be rendered on the plurality of display panels. The processor is configured to send the refresh instruction via a command interface between the processor and the respective display controller. The processor is configured to send a refresh trigger signal to each display controller of the plurality of display controllers upon receipt of the timing indication from each respective display controller of the plurality of display controllers. The timing indication is provided as a timing signal. The processor includes a signal processor configured to implement an AND operation on the timing signals generated by the plurality of display controllers. The device further includes an application processor configured to generate image data to be rendered on the plurality of display panels of the device. The signal processor is configured to synchronize the plurality of display panels when the application processor is not generating the image data. The application processor is further configured to provide an enable signal to each display controller of the plurality of display controllers to control whether the plurality of display controllers are responsive to an output from the signal processor indicative of the AND operation. One of the plurality of display controllers includes the signal processor. The signal processor includes a counter, the counter being configured to track a time elapsed since a last refresh. Each display controller of the plurality of display controllers is configured to receive image data via an image data interface. Each timing indication is provided as a respective timing signal on a respective dedicated line separate from the image data interface. The signal processor is enabled to control the plurality of display controllers when the plurality of display controllers are operating in a panel self-refresh mode of operation. The signal processor is configured to provide a collective timing signal to the processor indicative of whether the timing signals have been received from each display controller of the plurality of timing controllers. The signal processor includes an AND gate configured to implement an AND operation on the timing signals generated by the plurality of display controllers. The signal processor is configured as a state machine. The state machine includes a counter configured to track a time elapsed since a last refresh. The method further includes generating, with the processor, image data to be rendered on the plurality of display panels. Directing the plurality of display controllers includes sending a refresh instruction from the processor via a command interface between the processor and the respective display controller. The method further includes sending an enable signal from an application processor of the device to enable the processor to direct the plurality of display controllers. Directing the plurality of display controllers includes generating, with the processor, a trigger signal via an AND operation of the processor. Detecting the plurality of timing indications includes monitoring a respective dedicated line separate from an image data interface via which the plurality of display controllers are configured to receive image data.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

The invention claimed is:

1. A device comprising:
a plurality of display panels;
a plurality of display controllers, each display controller of the plurality of display controllers being configured to control a corresponding display panel of the plurality of display panels, each respective display controller of the plurality of display controllers being configured to generate a timing indication, wherein a first display controller of the plurality of display controllers is a primary display controller and a second display controller of the plurality of display controllers is a secondary display controller and the secondary display controller is configured to provide a secondary timing indication to the primary display controller; and
a processor coupled to the plurality of display controllers to receive a primary timing indication from the primary display controller;
wherein the secondary timing indication is indicative of the secondary display controller residing in a state ready for refresh of a corresponding display panel and the primary timing indication is indicative of the first display controller residing in a state ready for refresh of a corresponding display and having received the secondary timing indication from the secondary display controller, wherein directing the plurality of display controllers comprises generating, with the processor, a trigger signal via an AND operation of the processor, and
wherein the processor is configured to delay a refresh of the plurality of display panels until the primary timing indication is received from the primary display controller to synchronize the plurality of display panels.

2. The device of claim 1, wherein the processor is configured to send a refresh instruction to each display controller of the plurality of display controllers upon receipt of the primary timing indication from the primary display controller.

3. The device of claim 2, wherein:
the processor is configured to generate image data to be rendered on the plurality of display panels; and
the processor is configured to send the refresh instruction via a command interface between the processor and the respective display controller.

4. The device of claim 1, wherein the processor is configured to send a refresh trigger signal to each display controller of the plurality of display controllers upon receipt of the primary timing indication from the primary display controller.

5. The device of claim 4, wherein:
the secondary timing indication is provided as a timing signal.

6. The device of claim 5, further comprising an application processor configured to generate image data to be rendered on the plurality of display panels of the device, wherein the signal processor is configured to synchronize the plurality of display panels when the application processor is not generating the image data.

7. The device of claim 6, wherein the application processor is further configured to provide an enable signal to each display controller of the plurality of display controllers to control whether the plurality of display controllers are responsive to an output from the signal processor indicative of the AND operation.

8. The device of claim 5, wherein the processor comprises a signal processor.

9. The device of claim 5, wherein the signal processor comprises a counter, the counter being configured to track a time elapsed since a last refresh.

10. The device of claim 1, wherein:
each display controller of the plurality of display controllers is configured to receive image data via an image data interface; and
each timing indication is provided as a respective timing signal on a respective dedicated line separate from the image data interface.

11. A method of synchronizing a plurality of display panels of a device, the method comprising:
detecting, with a primary display controller, one or more secondary timing indications, each timing indication of the one or more timing indications being generated by a respective secondary display controller of a plurality of display controllers, the primary display controller and each secondary display controller of the plurality of display controllers being configured to control a corresponding display panel of the plurality of display panels, wherein each timing indication is indicative of the respective display controller residing in a state ready for refresh of the corresponding display panel; and
directing, with the primary display controller, the primary display controller and the plurality of secondary display controllers to refresh the plurality of display panels once the secondary timing indication from each respective secondary display controller of the plurality of display controllers is detected by the primary display controller to synchronize the plurality of display panels wherein directing the plurality of display controllers comprises generating, with the processor, a trigger signal via an AND operation of the processor.

12. The method of claim 11, further comprising generating, with a processor in communication with at least the primary display controller, image data to be rendered on the plurality of display panels, wherein directing the primary display controller and the secondary display controllers of the plurality of display controllers comprises sending a refresh instruction from the processor via a command interface between the processor and the respective display controller.

13. The method of claim 12, further comprising sending an enable signal from an application processor of the device to enable the processor to direct the plurality of display controllers.

14. The method of claim 11, further comprising detecting a primary timing indication with a processor, wherein detecting the primary timing indication comprises monitoring a respective dedicated line separate from an image data interface via which the plurality of display controllers are configured to receive image data.

15. A device comprising:
a plurality of display controllers, each respective display controller of the plurality of display controllers being configured to generate a timing indication, wherein a first display controller of the plurality of display controllers is a primary display controller and a second display controller of the plurality of display controllers is a secondary display controller and the secondary display controller is configured to provide a secondary timing indication to the primary display controller; and
a processor coupled to the plurality of display controllers to receive a primary timing indication from the primary display controller;
wherein the primary display controller comprises a signal processor configured to implement an AND operation on the timing signals generated by one or more secondary display controllers, and
wherein the processor is configured to delay a refresh instruction until the primary timing indication is received from the primary display controller to synchronize the plurality of display panels.

16. The device of claim 15, further comprising an application processor configured to generate image data to be rendered on the plurality of display panels of the device, wherein the signal processor is configured to synchronize the plurality of display panels when the application processor is not generating the image data.

17. The device of claim 15, wherein the signal processor comprises a counter, the counter being configured to track a time elapsed since a last refresh.

18. The device of claim 15, wherein implementing an AND operation on the timing signals generated by one or more secondary display controllers causes the primary timing indication to include both the primary timing indication and the one or more secondary timing indications.

19. The device of claim 15, wherein the secondary timing indication is indicative of the secondary display controller residing in a state ready for refresh of a corresponding display panel and the primary timing indication is indicative of the first display controller residing in a state ready for refresh of a corresponding display and having received the secondary timing indication from the secondary display controller.

20. The device of claim 15, further comprising the plurality of display panels, wherein the display controllers are each integrated with the respective display panels.

* * * * *